D. PEASE, Jr
Smut Mill.
No. 9,539.
Patented Jan. 11, 1853.
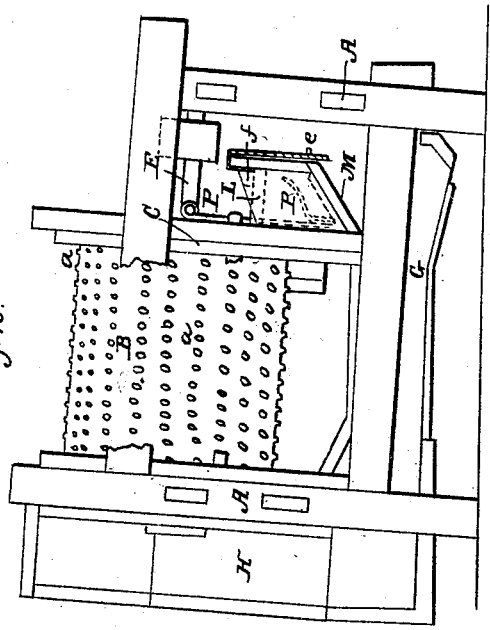
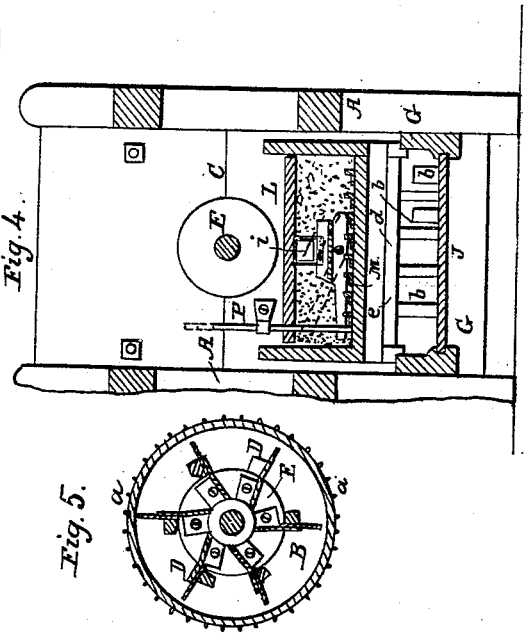
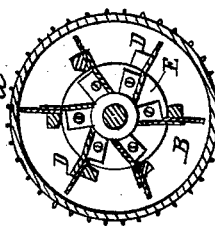
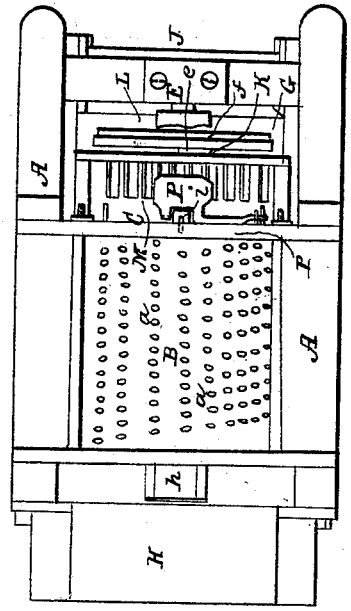
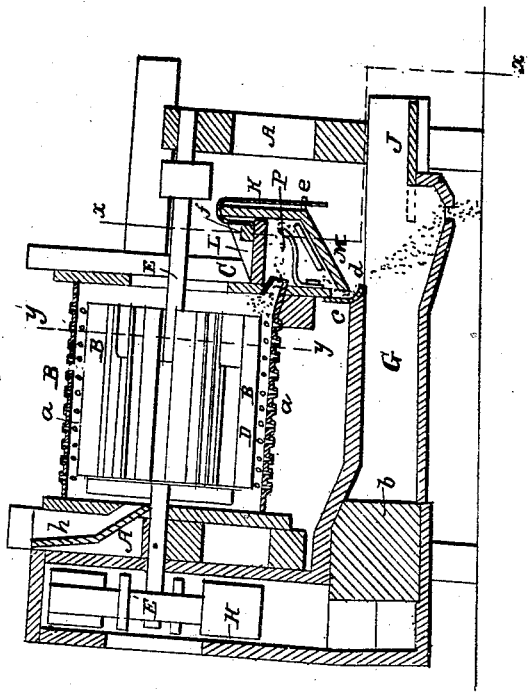

UNITED STATES PATENT OFFICE.

DAN PEASE, JR., OF FLOYD, NEW YORK.

IMPROVEMENT IN SMUT-MACHINES.

Specification forming part of Letters Patent No. 9,539, dated January 11, 1853.

*To all whom it may concern:*

Be it known that I, DAN PEASE, Jr., of Floyd, in the county of Oneida and State of New York, have invented certain new and useful Improvements in the Smut-Machine; and I do hereby declare that the following is a full, clear, and exact description of the same, reference being had to the accompanying drawings, forming part of this specification, in which—

Figure 1 is a plan or top view of a smut-machine having my improvements attached. Fig. 2 is a side elevation of the machine. Fig. 3 is a vertical longitudinal section of the same. Fig. 4 is a vertical transverse section taken in the line $x$ $x$ in Fig. 3. Fig. 5 is a vertical transverse section of the beaters, taken in the line $y$ $y$ in Fig. 3.

The nature of my invention consists in arranging a novel device for receiving and evenly spreading the grain as it comes from the cylinder in which it is cleaned directly around the discharge spout or opening of the cylinder, the said device or receiver being so constructed and arranged that the grain as it comes with great velocity from the scouring-cylinder will strike upon a deflector and against a plain surface of the receiver, and consequently will spread or fly in all directions until its upward inclination is arrested by an adjustable top and its consequent downward inclination arrested when it reaches the inclined ribbed bottom or surface of the receiver, which ribbed bottom prevents the further spreading of the grain, and also gives it a direction in an even state of distribution downward and toward the discharge-head of the scouring-cylinder, in which state of even distribution it is kept until it passes through the wind and from the machine.

To enable others skilled in the art to make and use my invention, I will proceed to describe its construction and operation.

A A represent the frame of a smut-machine, which may be of any suitable form and shape to suit the purpose intended.

B is the inclined perforated case or cylinder in which the grain is cleared of its impurities. The apertures $a$ $a$, through which the smut and other impurities escape as they are stripped from the grain, are of an oblong shape, and are cut spirally around the cylinder, so as to drive the grain toward the discharge-head C of the cylinder with greater force, and thereby overcome the resistance offered to the grain by the wind as it comes in at the opposite end of the cylinder to that at which the grain enters. The cutting of the slots or openings round the cylinder spirally is very essential in the horizontal machine, and also answers a very good purpose in inclined and upright smut-machines, for as the grain enters a cylinder having the slots or smut-openings cut around its periphery in straight lines, instead of spirally, the wind keeps it back and prevents it from coming toward the discharge-head, and a larger quantity of grain accumulates in the cylinder than desired, and consequently more driving-power is required.

D D are the revolving beaters for separating the smut from the grain, and also creating a draft for forcing the smut and other matter out through the perforations $a$.

E is the revolving shaft, to which the beaters D and the fan E′, for driving the wind through the wind-spout G, are secured fast.

H is the case in which the fan E′, for creating a blast through the wind-spout G, revolves when the machine is in operation. The wind-spout G is constructed with parallel vertical partitions $b$, (seen in Figs. 3 and 4,) set in advance of one another, so that the wind may be distributed in a broad sheet before it reaches the grain in its descent from the receiver and spreader. The case H may be made in the manner represented in the drawings, or in any more suitable way.

J is the chess-board, which may be shoved in nearer to or drawn out farther from the stream of grain coming from the receiver and spreader to suit circumstances, or in proportion to the amount of light stuff that it is intended shall be carried off by the wind.

$h$ is the feed-spout, and $i$ is the discharge spout or passage.

Having thus in general terms described a smut-machine invented and patented by me some time ago, I will now describe my improvement, and show the manner of applying the same to the above described and other smut-machines to which it may be applicable.

K L M is the receiver into which the grain passes as it comes from that side or end C forming the head or discharge end of the cylinder with considerable velocity, and strikes against the deflector P and plain surface K, which forms the front or opposite side of the receiver to that where the grain enters it, which causes it to fly and spread in all directions. The adjustable top L prevents it rising any higher than the space left between the under surface of the said top L and the top surface of the deflector P, and consequently it spreads in width and has an inclination downward until it meets the ribbed surface on the bottom piece, M, which prevents it from spreading any farther, and gives it a direction downward and toward the other side of the receiver, (which forms the head C of the cylinder,) the lower end, *c*, of which is made of sheet metal, and has a short turn, *d*, at the bottom edge to check the downward motion of the grain, causing it to fall with less velocity through the wind. The deflector P, the use of which is to guide the grain more to one side or to the other, or to get it to fall even, or both sides alike, it being adjustable, can be changed from one position to another, as indicated by dotted lines. This deflector gives the grain a little turn upward and causes it to spread. The adjustable top of the receiver is held up on the edge next to the cylinder by pins, which it rests upon, and the other edge is held up by a strap, which passes over the side K of the receiver, and which is attached or secured on a pin, *e*, on the outside and at the bottom of the portion K near the center. The edge to which the strap is attached has a weight, *f*, sufficiently heavy to carry it down when the strap is loosened. This strap may have a number of holes in it to fit over the pin *e*, so as to allow of the adjustable top being raised and lowered as desired, so that the spreading of the grain may be regulated according to the amount supplied from the smut-cylinder, for by letting the top L down it regulates the even distribution or spread of the grain or causes it to fall thicker in the middle, and raising it causes the grain to fall thicker each side or to spread to a greater degree.

In place of the deflector P can be used a short switch-spout, it being hung at the end where the grain enters it, the other end to be turned by a handle attached to it to direct the grain more to one side or the other.

The above-described method of spreading grain properly and causing it to fall through the wind in an even state of distribution I intend employing on horizontal, inclined, and vertical smut-machines.

What I claim as my invention, and desire to secure by Letters Patent, is—

1. The employment of the adjustable deflector P, set at an angle to throw the grain in different directions, in combination with the receiver K L M, the top of said receiver being adjustable to any height desired, and the front piece, K, of the same being set in such a position in relation to the deflector P that it will, when the grain strikes the deflector, be thrown against the said plain surface K, which, from its peculiar position, will throw the grain in a partially-spread state up against the adjustable top L, which causes it to spread still more, and then to fall down on the ribbed bottom M and pass off through the wind-pipe.

2. Causing the grain to spread to a greater or less degree by making the top of the receiver adjustable to different heights, in the manner and for the purpose herein described.

DAN PEASE, JR.

Witnesses:
E. J. STOUDARD,
WM. R. ANTHONY.